(12) United States Patent
Kephart (10) Patent No.: US 7,211,907 B2
(45) Date of Patent: May 1, 2007

(54) PROGRAMMABLE POWER CONTROL UNIT

(75) Inventor: David Kephart, Hollidaysburg, PA (US)

(73) Assignee: Chargeguard Inc., Altoona, PA (US)

( * ) Notice: Subject to any disclaimer, the term of this patent is extended or adjusted under 35 U.S.C. 154(b) by 227 days.

(21) Appl. No.: 11/084,900

(22) Filed: Mar. 22, 2005

(65) Prior Publication Data

US 2005/0231042 A1    Oct. 20, 2005

Related U.S. Application Data

(60) Provisional application No. 60/554,918, filed on Mar. 22, 2004.

(51) Int. Cl.
*H02H 7/18* (2006.01)

(52) U.S. Cl. .................... 307/10.7; 307/10.1

(58) Field of Classification Search .............. 307/10.7
See application file for complete search history.

(56) References Cited

U.S. PATENT DOCUMENTS 5,272,380 A * 12/1993 Clokie .................... 307/10.7

* cited by examiner

*Primary Examiner*—Robert L. Deberadinis
(74) *Attorney, Agent, or Firm*—Dennison, Schultz & MacDonald (57) ABSTRACT

A programmable power system may be used to control the supply of power from a battery to protect the battery from accidental discharge and excessive wear. A programmable power control unit may be connected between a battery and one or more battery operated devices. Typically, the battery is installed in a vehicle (e.g., a motor vehicle, an airplane, or a watercraft) although the unit may be used with any battery powered system. The programmable power control unit may be used to control the supply of power from the battery to one or more auxiliary devices, such as, for example, a two-way CB and ham radio, an AM/FM radio, a music player, a PDA, a TV, a DVD player, a cellular phone, a radar device, a GPS device, a data terminal, a display, and a computer. The programmable power control unit automatically turns the devices on in response to a predetermined battery operating condition, and turns the devices off after a predetermined time period in response a non operating condition.

21 Claims, 7 Drawing Sheets

PROGRAMMABLE POWER CONTROL UNIT

PRIORITY

This application claims priority from U.S. Provisional Application No. 60/554,918, filed Mar. 22, 2004, and titled PROGRAMMABLE TIMER POWER SWITCH, which is hereby incorporated by reference in its entirety for all purposes.

TECHNICAL FIELD

The following description relates generally to battery power control and in particular to programmable timers for controlling battery operated electronic devices.

BACKGROUND

Motor vehicle batteries frequently power a variety of auxiliary devices, such as, for example, two-way radios, AM/FM radios, TV's, DVD players, cellular phones, radar devices, GPS devices, data terminals, and computers. Many of these devices are memory intensive and/or consume a lot of power. These devices often remain powered on when the vehicle is unattended without regard to drain on the vehicle's battery. While such devices may be left in a powered on state to perform various functions (e.g., downloading data), the most common reason the devices remain powered on is the inconvenience of manually turning them off each time an operator stops or leaves the vehicle. As a result, undesired wear, drain, or unintentional discharge of the battery may occur.

SUMMARY

In one general aspect, a programmable power control unit connects a device to a battery to supply power from the battery to the device. The unit includes a first contact to connect to the battery, a second contact to connect to the device, a relay disposed between the first contact and the second contact to electrically connect the first contact to the second contact in response to a signal, a voltage detector connected to the first contact to detect a voltage at the first contact; and a processor to generate the signal to engage the relay if the voltage detected by the detector is above a predetermined level $V1$, to implement a timer function to count down a time period $T1$ when the detected voltage falls below $V1$ and the relay is engaged, to reset the timer if the detected voltage rises above $V1$ during a countdown, and to remove the signal to disengage the relay when the timer times out, and to remove the engage signal to disengage the relay if the detected voltage falls below a second predetermined voltage $V2$, wherein $V2<V1$.

The unit also may include a third contact to connect to the battery and a high and low voltage detector to generate a high and low voltage detection signal in response to high voltage $V3$ and low voltage $V4$, and the processor may be configured to generate the engage signal in response a detected voltage $V3$ or $V4$ to engage the relay.

The unit also may include an output to generate a signal to cause a device connected to the output to initiate a shutdown protocol and the processor may be configured to generate the output signal at a predetermined time period $T2$ before the expiration of the timer countdown.

The unit also may include an input to connect to an external clock. The processor may generate an engage signal to engage the relay in response to a signal on the input.

The processor also may be configured to implement a second timer function to count down a time period $T2$ when the detected voltage falls below a third predetermined voltage $V3$ and the relay is engaged, to discontinue the second timer if the detected voltage rises above $V3$ during the countdown, and to remove the engage signal to disengage the relay when the second timer times out, where and $V2<V3<V1$ and $T2<T1$.

The unit also may include an input to generate an override signal. The processor is configured to generate the signal to engage the relay in response to the override signal to implement a second timer function to count down a time period $T2$, and to discontinue the engage signal to disengage the relay when the second timer times out.

In another general aspect, a programmable power control unit for connecting a device to a battery to supply power from the battery to the device, the unit including a first contact to connect to the battery, a second contact to connect to the device, a relay disposed between the first contact and the second contact to electrically connect the first contact to the second contact in response to a signal, an engine sensor to detect operation of engine, a voltage detector connected to the first contact to detect a voltage at the first contact; and a processor to generate the signal to engage the relay when engine operation is detected, to implement a timer function when the detected voltage falls below $V1$ and the relay is engaged to count down a time period $T1$, to implement the timer function when no operation of the engine is detected, to reset the timer if the detected voltage rises above $V1$ during a countdown or engine operation is detected, and to remove the signal to disengage the relay when the timer times out, and to remove the signal to disengage the relay if the detected voltage falls below a second predetermined voltage $V2$, wherein $V2<V1$.

The unit also may include a means for removing noise from the engine sensor causing the engine sensor to generate false indications of engine operation to the processor and prevent starting of the timer function.

Other features will be apparent from the description, the drawings, and the claims.

DETAILED DESCRIPTION

A programmable power system may be used to control the supply of power from a battery to protect the battery from accidental discharge and excessive wear. A programmable power control unit may be connected between a battery and one or more battery operated devices. Typically, the battery is installed in a vehicle (e.g., a motor vehicle, an airplane, or a watercraft) although the unit may be used with any battery powered system. The programmable power control unit may be used to control the supply of power from the battery to one or more auxiliary devices, such as, for example, a two-way radio, an AM/FM radio, a music player, a PDA, a TV, a DVD player, a cellular phone, a radar device, a GPS device, a data terminal, a display, and a computer.

Figure 1:
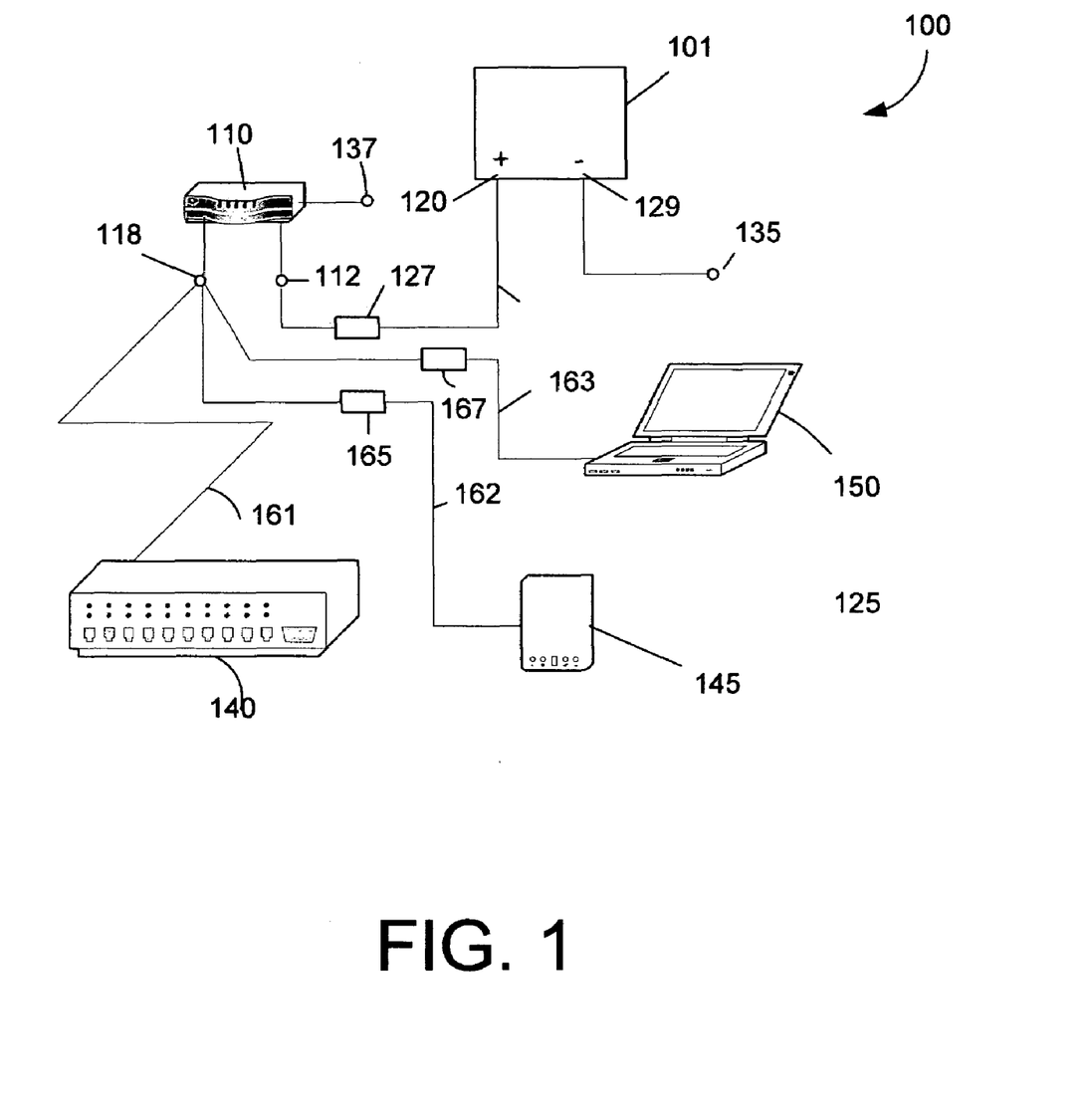
FIG. 1 illustrates an exemplary connection of a system to implement a programmable power control unit.

As shown in FIG. 1 the system 100 includes a battery 101, a programmable power control unit 110, and several auxiliary devices. The programmable power control unit 110 includes two primary contacts 112, 118. A first contact 112 of the programmable power control unit 110 is connected to a positive terminal 120 of a battery 101 by a connection 125 (e.g., a wire) that includes a fuse 127 (e.g., a 30 Amp fuse). The other terminal 129 of the battery 101 is grounded 135. The programmable power control unit 110 also is grounded 137 (e.g., to the chassis of the vehicle). The second contact 118 of the programmable power control unit 110 is connected to several devices. For example, a two way radio 140, a PDA 145, and laptop computer 150 are connected to the second contact 118 by wires 161, 162, 163. In this example, the wires 162, 163 connecting the PDA 145 and the laptop 150 to the programmable power control unit 110 include fuses 165, 167 matched to the devices 145, 150; however, the combined fuse ratings of the devices should not exceed the fuse rating of the connection between the programmable power control unit 110 and the battery 101.

In the following examples, a 12 volt automobile battery is described; however, one skilled in the art will appreciate that other types of batteries may be used with minor modifications of the circuit components described below to render the circuit compatible with operating voltage levels of other battery types.

The programmable power control unit 110 may be programmed to monitor various operating conditions of the system 100 and to control the supply of power from the battery 101 to the auxiliary devices 140, 145, and 150. For example, the programmable power control unit 110 may detect the voltage supplied at the first contact 112. When the programmable power control unit 110 determines a motor of the vehicle is running (and an alternator is charging the battery) or another predetermined condition is met (e.g., the voltage at the contact measures approximately 13.4 VDC or higher), the programmable power control unit 110 is in an active mode and connects the battery 101 to the devices 140, 145, and 150. If the voltage rises above 18 VDC, the programmable power control unit 110 interrupts supply of power from the battery 101 to the devices 140, 145, and 150.

When the vehicle is shut off or another predetermined condition is met (e.g., the voltage at the contact 112 falls below a voltage, such as 12.4 VDC), the programmable power control unit 110 enters a timing mode and maintains a connection of the battery 101 to the devices for a predetermined period of time (e.g., 5 seconds to infinity, typically 1–15 hours). After the predetermined period of time elapses, the programmable power control unit 110 disconnects the battery 101 from the devices 140, 145, and 150 and enters a standby mode. If a condition (e.g., detection of motor running) causes the programmable power unit to leave the timing mode and enter the active mode, the timer is reset for the next timing mode operation.

If at any time the voltage detected at the first contact 112 drops below 11 VDC, the programmable power control unit 110 starts a second timer for a second predetermined period of time (e.g., 15 minutes). After the second predetermined period of time elapses, the programmable power control unit 110 disconnects the battery 101 from the devices 140, 145, and 150 and enters the standby mode. If at any time during the countdown of the second predetermined time period the detected voltage rises above 11 VDC, the second timer is reset and awaits the next below 11 VDC detection. If at any time the voltage detected at the first contact 112 drops below 10 VDC and the device is in the standby mode (i.e., not active or timing , the programmable power control unit 110 powers down to an inactive mode to prevent logic elements from the programmable power control unit from placing any further drain on the battery 101. The various modes, functions and configurations of the programmable power control unit 110 are explained in further detail below.

Figure 2:
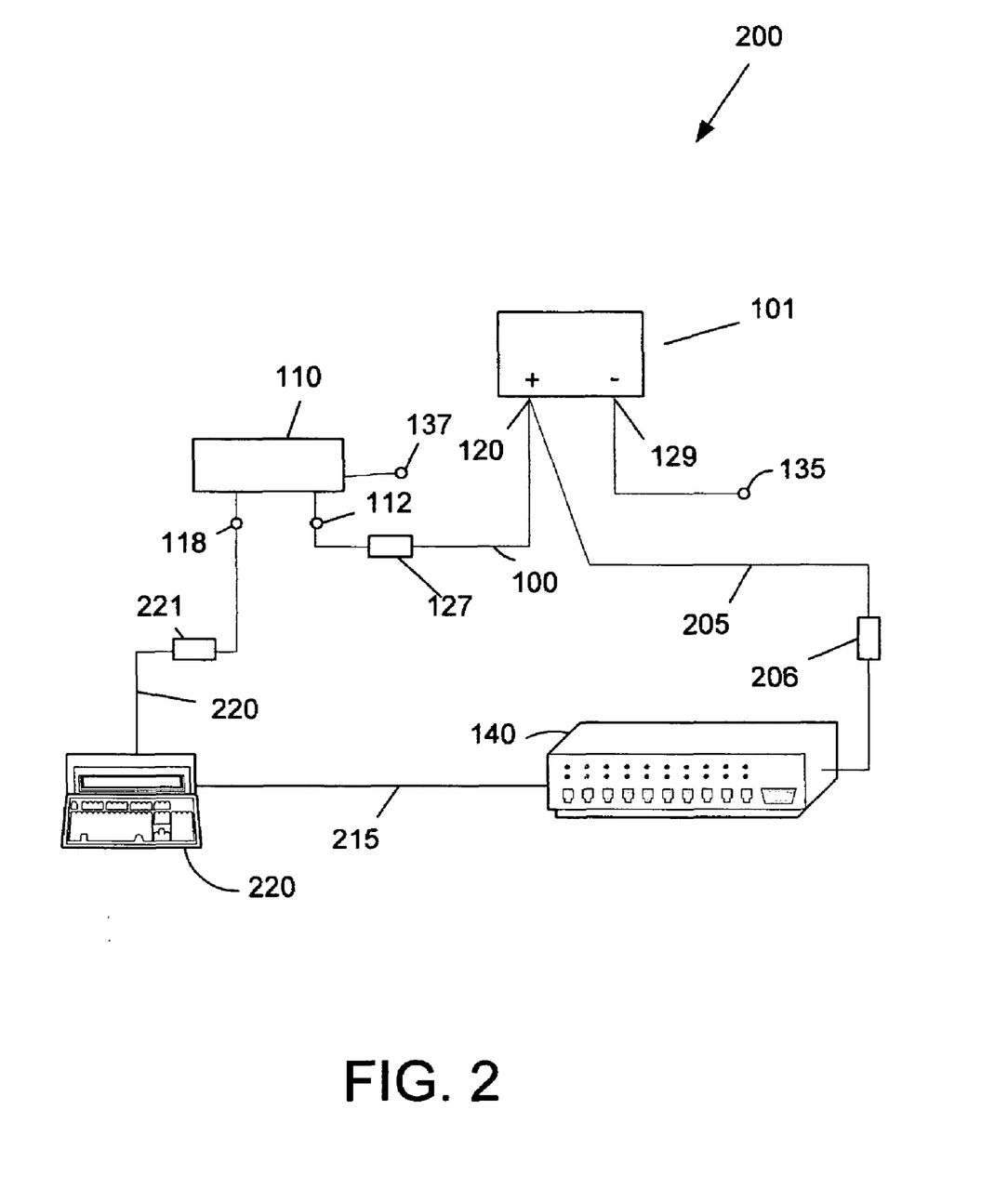
FIG. 2 illustrates another exemplary connection of a programmable power control unit.

FIG. 2 illustrates an alternative circuit connection 200 of the programmable power control unit 110 and an auxiliary device 140. The first contact 112 of the programmable power control unit 110 and battery 101 are connected as described for FIG. 1; however, the auxiliary device 140 is connected to the positive terminal 120 of the battery 101 using a connection 205 and fuse 206. A power switch 210 is connected to the device 140 by a control cable 215 to turn the device 140 on or off. A connection 220 with fuse 221 between the power switch 210 and the second contact 118 of the programmable power control unit 110 is made to complete the circuit 200. The programmable power control unit 110 may operate the power switch 210 to control the supply of power from the battery 101 to the device 140 based on the voltage detected at the first contact 112 as described above. Such a configuration may be useful when placing the device 140 at some distance from the battery 101 (e.g., if the device 140 is installed in a trunk of a vehicle).

Figure 3:
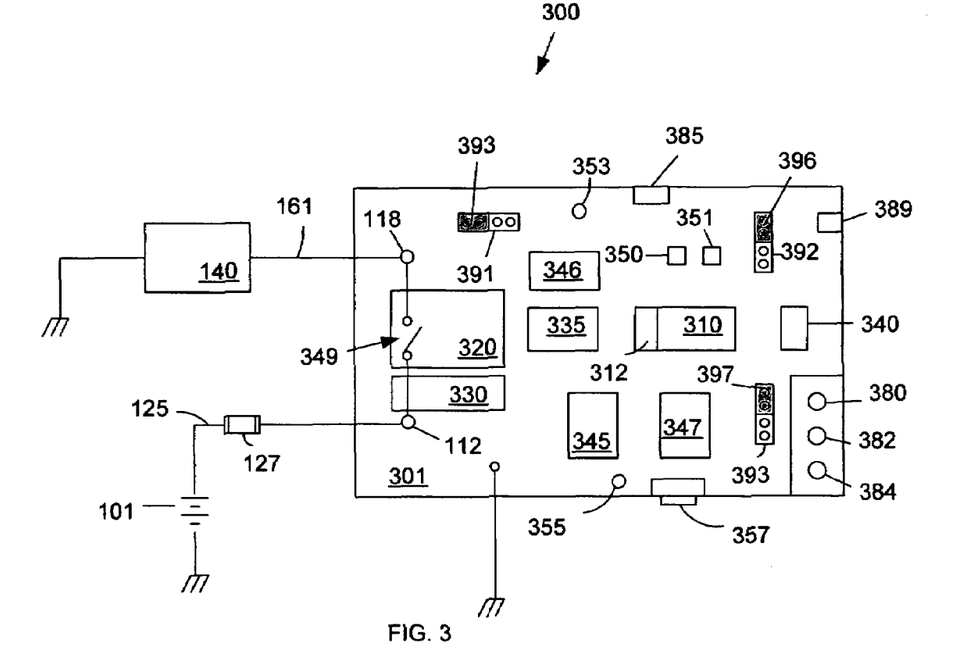
FIG. 3 illustrates an exemplary plan view of a circuit board and connection for the programmable power control unit of FIGS. 1 and 2.

FIG. 3 illustrates a plan view 300 of a circuit board 301 for one implementation of the programmable power control unit 110. The circuit board 301 may be used to control the supply of power from a battery 101 to a device 140. Although, one device 140 is shown in FIG. 3, multiple devices may be connected to and controlled by the programmable power control unit 110 (e.g., as shown above in FIG. 1). As shown in FIG. 3, the programmable power control unit 110 may be implemented using a circuit board 301 including a processing device 310, a memory 312, a relay 320, a voltage regulator circuit 330, an engine operation sensor 335 and/or AC signal sensor 336, a DC voltage detection circuit 340, a maximum/minimum voltage detection circuit 345, a high/low DC voltage detection circuit 347, and a number of various connector, contacts, and inputs.

The battery 101 is connected to a first contact 112 of the circuit board (e.g., a terminal screw) by a wire 125 with a fuse 127. The device 140 is connected to a second contact 118 (e.g., a terminal screw) of the circuit board 301. A relay 320 is connected between the first and second contacts. The relay 320 includes a switch 349 that may be used to connect the battery 101 to the device 140. The relay 320 may be a mechanical relay and switch or an equivalent electronic device. The relay 320 is controlled by the processing device 310 as described below.

A voltage regulation circuit 330 may be disposed between the first contact 112 and the relay 320 to protect the relay 320 from excessive voltage/current that my cause the relay 320 to overheat, malfunction, or otherwise become damaged.

The processing device 310 may be implemented using a general-purpose or a special purpose computer, such as, for example, a processor, a digital signal processor (DSP), a microcomputer, a microcontroller, or a microprocessor capable of responding to and executing instructions in a defined manner. The processing device 310 may run one or more software applications to command and direct the processing device 310 to perform various functions. These functions are described in detail below. The software applications may include a computer program, a piece of code, an instruction, or some combination thereof, for independently or collectively instructing the processing device 310 to operate as desired.

The processing device 310 also may access, store, and create data in response to the applications. The processing device may include a number of inputs and outputs to detect and control the programmable power control unit functions, as described below.

The applications and data may be embodied permanently or temporarily in any type of storage medium capable of providing instructions to or being interpreted by the processing device 310. In particular, the applications and data may be stored in a storage device 312, such as a volatile and non-volatile memory (e.g., a read only memory (ROM), a random access memory (RAM), a flash memory, a DROM, a flip-flop; a register, a PROM, an EPROM, an OPTROM, or an EEPROM), such that if the storage device 312 is read by the processing device 310, the specified steps, processes, and/or instructions are performed and/or the desired data is accessed or stored.

In one implementation, the processing device 310 and memory 312 may be implemented using a CMOS Flash based 8 bit microcontroller with 64K EEPROM memory.

Figure 9:
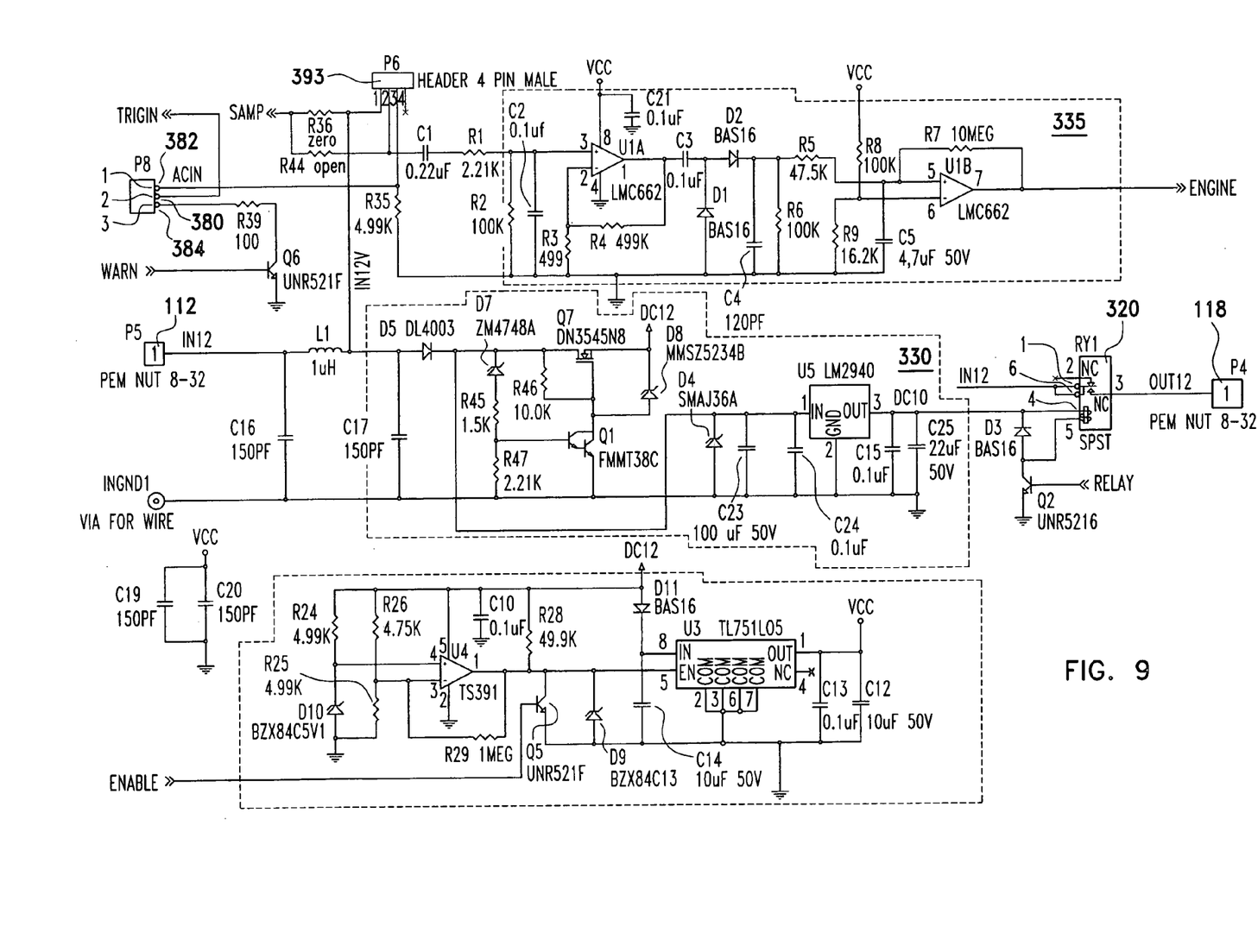
FIGS. 9 and 10 are exemplary schematics for the programmable power control unit of FIG. 3.

The programmable power control unit 110 may include an engine operation sensor 335. The engine operation sensor 335 may be implemented using a noise or pressure sensor as described in prior U.S. Pat. Nos. 4,950,913 and 5,272,386, both of which are incorporated herein by reference in their entity for all purposes. Another implementation of the engine sensor 335 is shown in the schematic of FIG. 9. The engine sensor 335 detects when the engine is running. The programmable power control unit 110 also may include an AC signal detector 335 to detect an AC signal at the first contact 112 (e.g., from an alternator of a motor). The programmable power control unit 110 also may include a detector 340 for DC voltage to determine when battery 101 voltage at the first contact 112 is greater than a predetermined voltage (e.g., 13.2 to 13.4VDC) indicating an alternator AC is charging the battery. When the engine sensor 335, AC signal detector 336, or DC voltage detector 340 provide a signal to the processing device 310 that the vehicle engine is running and the battery 101 and the alternator are functioning correctly, the processing device 310 enters an active mode and engages the relay 320 to close the switch 349 and connect the battery 101 to the device 140 to supply power to the device 140.

The processing device 310 also implements a programmable timer to control the supply of power from the battery 101 to the device 140. The timer may be programmed to be set to a first predetermined period of time T1 (e.g., 5 seconds to infinity, typically 1–15 hours). An input, for example, push buttons 350, 351, may be provided to program the timer of the processing device 310. Pressing button 350 increases the time period T1 (e.g., in one hour increments) and pressing button 351 decreases the time period T1 (e.g., in one hour decrements). In one example, pushing both buttons 350, 351 simultaneously causes the processing device 310 to output an indication of the programmed time period T1. An indicator, for example, a light emitting diode (LED) 353 may flash a corresponding sequence to indicate the programmed time period T1 (e.g., one flash for each hour). The programmed time period T1 may be stored in the storage device 312.

During active mode operation when the relay 320 is engaged, the processing unit monitors the engine sensing signal, the AC detect signal, and/or the DC voltage at the first contact 112. If the engine turns off, the AC signal is removed, or the DC voltage at the first contact 112 falls below a predetermined voltage V1 (e.g., 12.8 VDC), the processing device 310 enters a timing mode and triggers a first timer. Once triggered, the timer starts to count down the first predetermined time period T1. When the timer times out, the processing device 310 disengages the relay 320 by opening switch 349 to interrupt supply of power from the battery 101 to the device 140 and enters a standby mode.

The programmable power control unit 110 also may implement a low voltage function. The low voltage function may take priority over the timing mode functions. If the voltage supplied by the battery 101 at the first contact 112 drops below a first predetermined low voltage LV1 (e.g., 11 VDC for a 12 volt battery 101), the processing device 310 enters the timing mode (if not already in the timing mode) and starts a secondary timer having a second predetermined time period T2 (e.g., 15 minutes). After the secondary timer times out, the relay 320 is disengaged to inhibit supply of power from the battery 101 to the device 140 and the processing device 310 may enter a standby mode. If at any time during the countdown of the second timer the programmable power control unit 110 enters the active mode or determines a voltage higher than LV1 at the first contact 112, the second timer is reset and awaits the next low voltage condition.

The programmable power control unit 110 also may implement a maximum/minimum voltage detector 345. If the voltage supplied at the first contact 112 rises above a predetermined level HV1 (e.g., 18 VDC for a 12 volt battery), the maximum/minimum voltage detector 345 provides a signal to the processing device 310. The processing device 310 automatically disengages the relay 320 to inhibit supply of power to the device 140 to help protect the device 140 against damage that may be caused by, for example, a faulty voltage regulator or improper jump start.

The maximum/minimum voltage detector 345 may additionally monitor for a second predetermined low voltage LV2 (e.g., 10 VDC for a 12 volt battery 101). If the voltage supplied by the battery 101 to the first contact 112 falls below the second predetermined low voltage LV2, the programmable power control unit 110 powers down all logic elements of the unit (e.g., the processing device 310 to inhibit further drain on the battery 101 and the programmable power control unit 110 enters an inactive mode. If the programmable power control unit 110 is in the timing mode when the LV2 is detected, the programmable power control unit 110 waits until the timer has elapsed before powering down and entering the inactive mode. Alternatively, the processing device 310 may remain powered in a standby mode to a lower voltage (e.g., 7.5 VDC) The circuit board 301 may include an indicator, such as LED 355 (e.g., a red LED) to indicate a DC voltage level at the first contact. If the detected voltage is 13.2 VDC or above, the LED 355 is lit. Alternatively, the LED 355 may indicate other functions, such for example, whether the unit is under AC or DC operation or if the unit is in a certain operation mode (e.g., active, timing, or standby).

An emergency override function to the processing device 310 may be provided on the circuit board 301. The override function may be used when the processing device 310 has disengaged the relay 320 to inhibit supply of power to a device 140. When the input 357 (e.g., a push button) is selected the processing device 310 momentarily engages the relay 320 to connect the battery 101 to the device 140. Simultaneously, the processing device 310 enters the timing mode and begins the secondary timer to count down time period T2. When the timer times out, the processing device 310 disengages the relay 320 again. In a secondary function, the input 357 may be selected (e.g., holding the button for more than 4 seconds) during any timer count down (e.g., either T1 or T2), causing the processing device 310 to disengage the relay 320 and inhibit supply of power from the battery 101 to the device 140. For protection of the device 140 and the electrical system, the emergency override does not function at voltages greater than 18 VDC.

The circuit board 301 includes a number of inputs and contacts (e.g., various jumpers, pins, contacts and connectors) to provide different configurations, programming, and functionality of the programmable power control unit 110. For example, screw connectors 380, 382, and 384 for external wiring are provided to enable specific functions and a pin connector 389 for a warning function. In addition, several 4 pin connectors 391, 392, and 393 with jumpers 395, 396, and 397 also are provided to control operation of the programmable power control unit 110. As shown in FIG. 3, with the jumpers 395, 396, and 397 placed on pins 1 and 2 of the connectors the functioning describe above may be implemented. However, the jumpers 395, 396, and 397 may be positioned on these connectors 391, 392, and 393 to implement several other trigger functions or sensing configurations for controlling the timer and the relay 320, such as, for example, a DC only function, an engine sensing function, and a high/low (H/L) function. Each of these configurations and functions are described in further detail below. In one implementation, removing the jumper 395 disables buttons 350 and 351, so that the time period T1 may not be altered.

An input 385 may be provided to allow an external device to connect to the circuit board 301 and the processing device 310. The input 385 may be used, for example, to input or change programming of the processing device.

Figure 4:
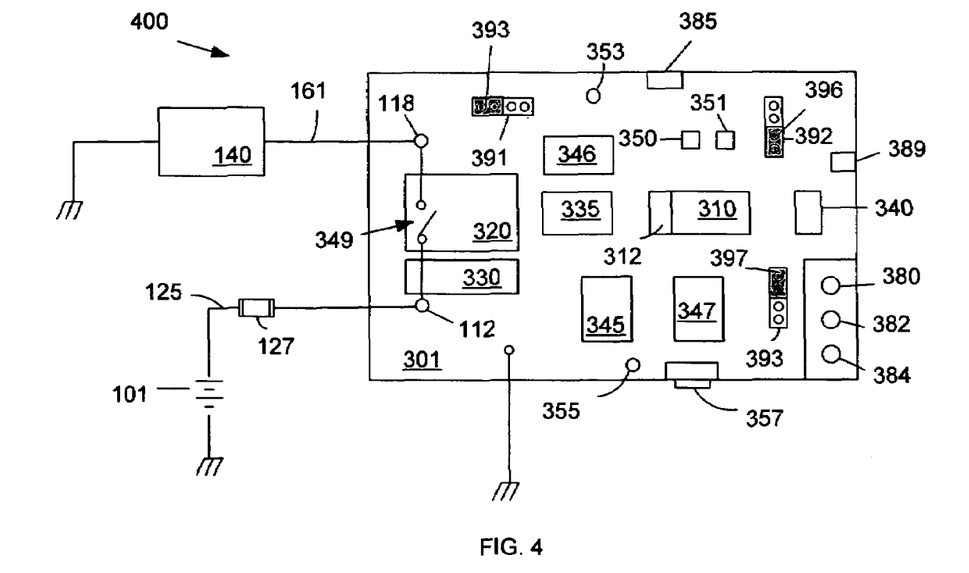
FIGS. 4–8 illustrate various jumper settings and connections to implement alternative functions of the programmable power control unit of FIG. 3.

As shown in FIG. 4, the programmable power control unit 110 may be configured 400 for DC only sensing. The DC only function may be selected by an input device to enable a DC only sensor 340 when AC monitoring is not necessary or desired. For example, by moving jumper 396 from pins 1 and 2 to pins 3 and 4 of the connector 392, AC detection at the first contact 112 is disabled and the operation is controlled by measurement of DC voltage at the first contact 112. In this configuration, the DC sensor 340 monitors rise and fall of voltage at the first contact 112. When the voltage is above a predetermined level (e.g., 13.4 VDC), the processing device 310 engages the relay 320. When the voltage falls to a predetermined level (e.g., 12.8 VDC), the processing device 310 triggers the timer for the time period T1. When the timer times out, the processing device 310 disengages the relay 320 to interrupt supply of power from the battery 101 to the device 140.

Figure 5:
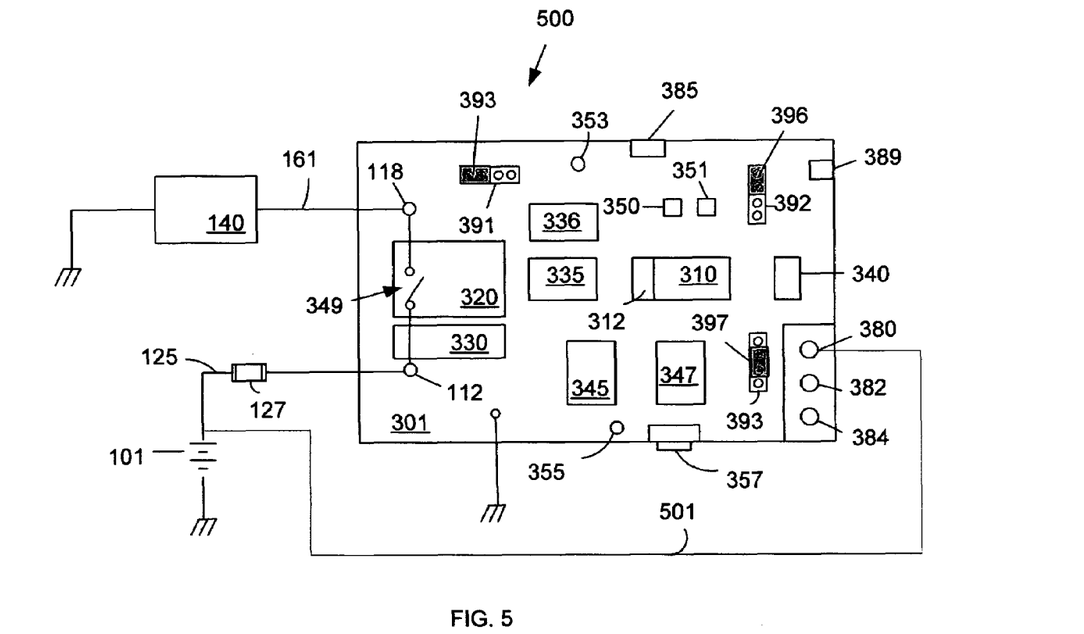

As shown in FIG. 5, the programmable power control unit 110 also may be configured to eliminate noise from the AC sensing function for more accurate readings. In some instances, noise on the first contact 112 (e.g., due to transformers or power supplies of various devices connected to contact) may simulate an operating condition indicating that the battery 101 is being charged or the motor is running when in fact the battery 101 is only being discharged. The programmable power control unit 110 may be configured to eliminate such noise and make an accurate determination of the battery 101 condition.

In one implementation 500, the programmable power control unit 110 is placed in an ES mode by moving the jumper 397 from pins 1 and 2 to pins 2 and 3 of connector 393. This moves detection by the engine operation sensor 335 or AC signal sensor 336 from the first contact 112 and redirects it to screw terminal 380. In addition, a connection 501 is made from the battery 101 to the screw terminal 380. When in ES mode, the processing device 310 measures the voltage at the screw terminal 380 instead of the first contact 112 to determine the battery operation and if the timer T1 should be triggered. Because the processing device 310 measures the voltage at the screw terminal instead of the first contact 112, any AC noise caused by the devices connected to the second contact 118 when relay 320 is engaged is eliminated. In addition, because only the voltage is being detected at screw terminal 380 (compared to contact 112 which must supply power to the device through relay 320) a much smaller gage wire may be used to implement connection 501.

Figure 6:
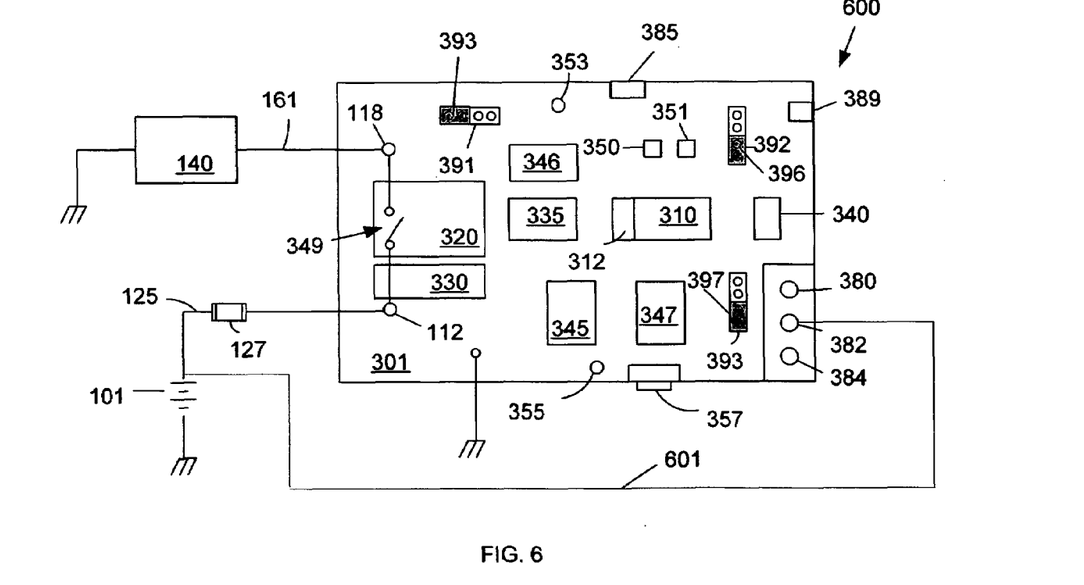
Figure 7:
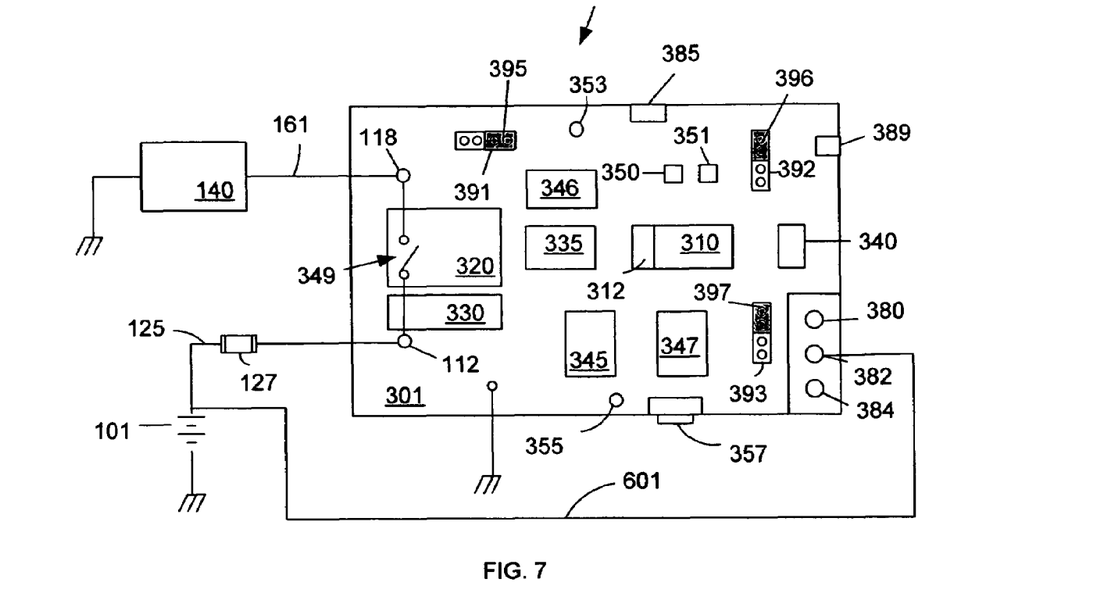

As shown in FIGS. 6 and 7, the programmable power control unit 110 also may be placed in a high voltage or low voltage sensing state. In this implementation, a connection 601 is made between the battery 101 and the contact 382. The processing device 310 may be configured by an input device to monitor for a high voltage (e.g., >8 volts DC) or a low voltage (e.g., <4 volts DC). For example, moving the jumper 397 from pins 1 and 2 to pins 3 and 4 of connector 393 configures a high voltage detection trigger (as shown in FIG. 6), and moving jumper 395 from pins 1 and 2 to pins 3 and 4 of connector 391 configures low voltage detection (as shown in FIG. 7). In this configuration, the voltage is monitored by a high/low voltage detection circuit 347 at contact 382. When either the high voltage or low voltage condition is detected by the circuit 347, a signal is provided to the processing device 310. In response, the processing device 310 engages the relay 320 to connect the battery 101 to the device 140.

When the signal is removed, the timer of the processing device 310 having the time period T1 is triggered. When the timer times out, the processing device 310 disengages the relay 320 and the supply of power from the battery 101 to the device 140 is interrupted. This configuration 600/700 may be useful when connecting the programmable power control unit 110 to an ignition switch so that the relay 320 is engaged when the ignition is turned on. In addition, the contact may be configured to receive a signal from an external clock. In response to the clock signal, the processing device 310 may engage the relay to connect the battery 101 to the device 140. This may be useful when implemented in a vehicle with a data terminal, computer, or other device to start the device at a predetermined time in response to the external clock signal so that the device 140 can perform any necessary functions (such as diagnostics or downloading data) before a shift or crew arrives to use the vehicle.

Figure 8:
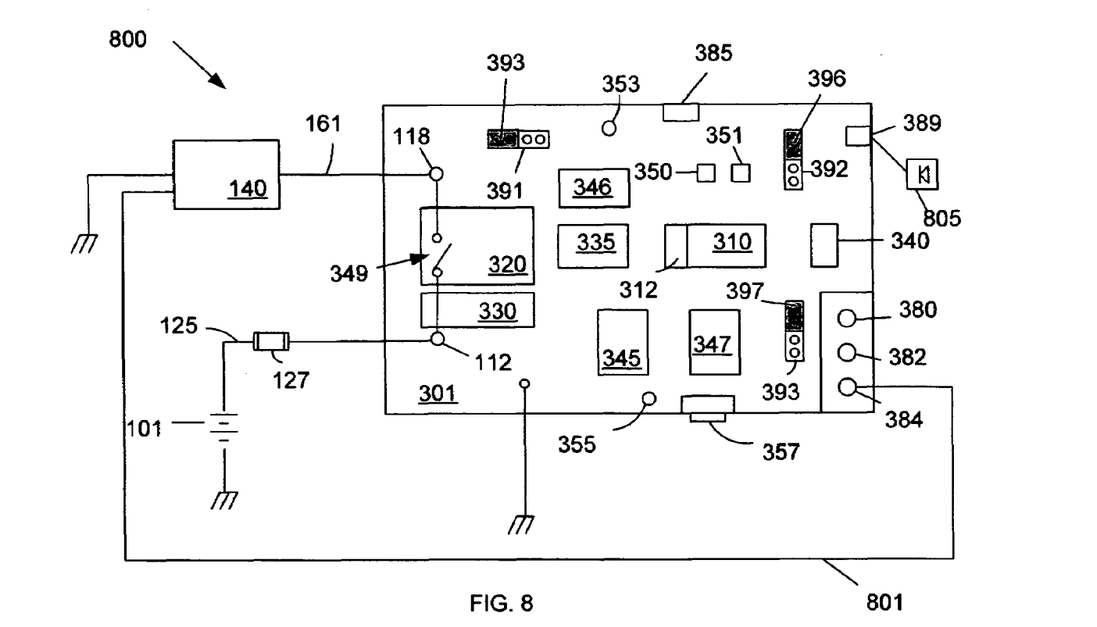

As shown in FIG. 8 a pre-warning function may be implemented to warn users when the processing device 310 is about to disengage the relay 320 and inhibit the supply of power from the battery 101 to the device 140. When the processing device 310 determines that relay 320 will be disengaged in a predetermined amount of time (e.g., two minutes), the processing device 310 may send a signal to an output or a contact 384 that is connected to the device 140. The signal on the output 384 may be sent through a connection 801 (e.g., a wired or wireless connection) to be detected by the device 140 connected to the battery 101 through the programmable power control unit 110. In response to the signal, the device may initiate a shutdown routine to prevent loss of data and/or ensure a proper shutdown state is attained before the supply of power is interrupted. Such a function is useful for devices with memories, for example, data terminals and computer devices.

Alternatively, a warning device may be attached to a connector 389 (e.g., a pin connector) to give an indication (e.g., visual and/or audible) to a user of the device 140 that power is about to be disengaged so that the user may take appropriate action. For example, if the programmable power control unit 110 is mounted in a manner that it is not easily accessible or viewable from the passenger compartment of the vehicle, it may be desirable to connect a remote pushbutton or input device to provide override function, and a remote LED 805 to indicate the status of the device. This remote LED 805 may be connected to the connector 389, as shown in FIG. 8. Preferably, the remote LED 805 is a tri-color LED that may indicate device status, for example, as follows:

in timing mode, FLASHING GREEN;
in timing mode with voltage less than 11 VDC, FLASHING YELLOW;
in timing mode with voltage less than 10 VDC, FAST FLASHING RED;
in standby mode with voltage less than 11 VDC, FLASHING RED;
in inactive mode with voltage greater than 18 VDC, SOLID RED;
in standby mode with voltage greater than 13.4 VDC, SOLID YELLOW; and
in timing mode during last two minutes of operation, FAST FLASHING GREEN.

Figure 10:
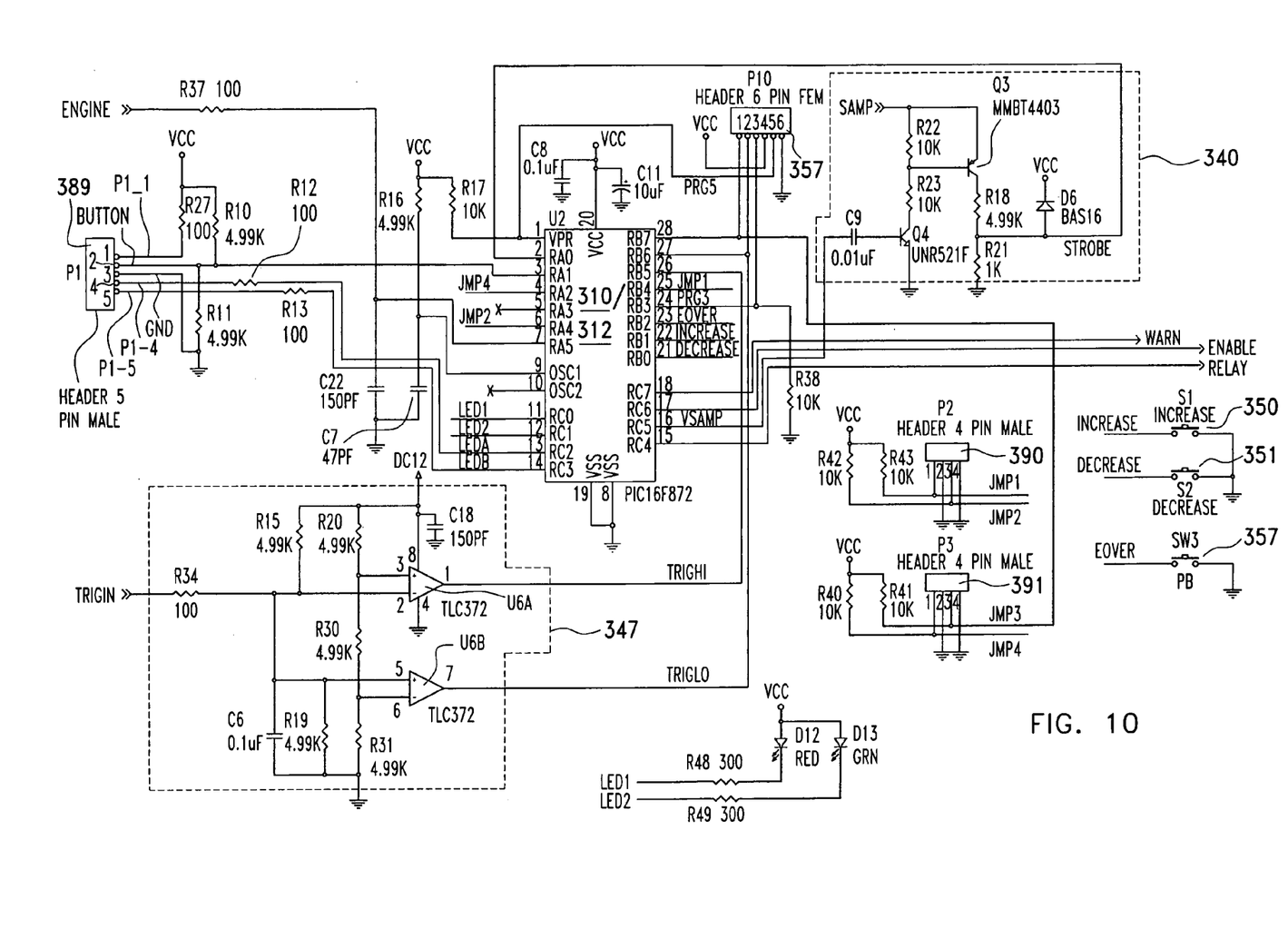

FIGS. 9 and 10 show schematics of one implementation of the circuits for the circuit board to implement the functions as described above. Reference numbers of the various components and connectors are the same as given above for FIG. 3. As shown, the signal INCREASE causes the processing device 310 to increment timer T1, and the signal DECREASE causes the processing device 310 to decrement the timer T1. The signal EOVER causes the processing device 310 to engage the emergency override function. The signal TRIGIN is the DC voltage measured the DC high/low detection circuit 347. A signal on TRIGHI causes the processing device to engage relay and removal starts timer T1. A signal on TRIGLO causes the processing device to engage relay and removal starts timer T1. The signal SAMPLE is provided to the DC voltage detection circuit 340 to measure the DC voltage. DC measurements are supplied by a STROBE line. The ENGINE signal is output from the engine sensing circuit to cause the processing device to engage the relay 320. Removal causes the timer T1 to count down. Signal RELAY causes the relay to engage to provide power to the device 140. Removal causes the relay to disengage and disconnect the battery 101 from the device 140. Signal WARN is output to a device to indicate that the timers T1 or T2 will time out in a predetermined period of time. This allows devices or operators to take action or initiate a shutdown routine.

In addition, the signal ENABLE may be provided by the processing device 310 as a software enable during critical times, for example, during an emergency override or when the relay 320 is on during a quiet state timing down. Normally, 5V is delivered to the logic circuits whenever the battery voltage is greater than 10VDC. However, this power is removed with the processing device 310 shuts down or is idle and the battery is below 10.0V. However, if the emergency override is engaged, then the software enable line is used to keep the 5V supply to the logic circuits even if the battery voltage drops below 10.0V. Once the timer T2 times out and the relay 320 is disengaged, then the software enable is removed.

A number of exemplary implementations have been described. Nevertheless, it will be understood that various modifications may be made. For example, suitable results may be achieved if the steps of described techniques are performed in a different order and/or if components in a described system, architecture, or device are combined in a different manner and/or replaced or supplemented by other components. Accordingly, other implementations are within the scope of the following claims.

What is claimed is:

1. A programmable power control unit for connecting a device to a battery to supply power from the battery to the device, the unit comprising:
   a first contact to connect to the battery;
   a second contact to connect to the device;
   a relay disposed between the first contact and the second contact to electrically connect the first contact to the second contact in response to a signal;
   a voltage detector connected to the first contact to detect a voltage at the first contact; and
   a processor to generate the signal to engage the relay if the voltage detected by the detector is above a predetermined level V1, to implement a timer function to count down a time period T1 when the detected voltage falls below V1 and the relay is engaged, to reset the timer if the detected voltage rises above V1 during a countdown, and to remove the signal to disengage the relay when the timer times out, and to remove the engage signal to disengage the relay if the detected voltage falls below a second predetermined voltage V2, wherein V2<V1.

2. The unit of claim 1 further comprising:
   a third contact to connect to the battery;
   a high and low voltage detector to generate a high and low voltage detection signal in response to high voltage V3 and low voltage V4, wherein the processor is configured to generate the engage signal in response a detected voltage V3 or V4 to engage the relay.

3. The unit of claim 1 further comprising an output to generate a signal to cause a device connected to the output to initiate a shutdown protocol wherein the processor is configured to generate the output signal at a predetermined time period T2 before the expiration of the timer countdown.

4. The unit of claim 1 further comprising an input to connect to an external clock, wherein the processor generates an engage signal to engage the relay in response to a signal on the input.

5. The unit of claim 1 wherein the processor is configured to implement a second timer function to count down a time period T2 when the detected voltage falls below a third predetermined voltage V3 and the relay is engaged, to discontinue the second timer if the detected voltage rises above V3 during the countdown, and to remove the engage signal to disengage the relay when the second timer times out, where and V2<V3<V1 and T2<T1.

6. The unit of claim 1 further comprising an input to generate an override signal wherein the processor is configured to generate the signal to engage the relay in response to the override signal to implement a second timer function to count down a time period T2, and to discontinue the engage signal to disengage the relay when the second timer times out.

7. A programmable power control unit for connecting a device to a battery to supply power from the battery to the device, the unit comprising:
a first contact to connect to the battery;
a second contact to connect to the device;
a relay disposed between the first contact and the second contact to electrically connect the first contact to the second contact in response to a signal;
an engine sensor to detect operation of engine;
a voltage detector connected to the first contact to detect a voltage at the first contact; and
a processor to generate the signal to engage the relay when engine operation is detected, to implement a timer function when the detected voltage falls below V1 and the relay is engaged to count down a time period T1, to implement the timer function when no operation of the engine is detected, to reset the timer if the detected voltage rises above V1 during a countdown or engine operation is detected, and to remove the signal to disengage the relay when the timer times out, and to remove the signal to disengage the relay if the detected voltage falls below a second predetermined voltage V2, wherein V2<V1.

8. The unit of claim 7 further comprising means for removing noise from the engine sensor causing the engine sensor to generate false indications of engine operation to the processor and preventing starting of the timer function.

9. The unit of claim 7 further comprising:
a third contact to connect to the battery; and
a high and low voltage detector to generate a high and low voltage detection signal in response to high voltage V3 and low voltage V4, wherein the processor is configured to generate the engage signal in response a detected voltage V3 or V4 to engage the relay.

10. The unit of claim 7 further comprising an output to generate a signal to cause a device connected to the output to initiate a shutdown protocol wherein the processor is configured to generate the output signal at a predetermined time period T2 before the expiration of the timer countdown.

11. The unit of claim 7 further comprising an input to connect to an external clock, wherein the processor generates an engage signal to engage the relay in response to a signal on the input.

12. The unit of claim 7 wherein the processor is configured to implement a second timer function to count down a time period T2 when the detected voltage falls below a third predetermined voltage V3 and the relay is engaged, to discontinue the second timer if the detected voltage rises above V3 during the countdown, and to remove the engage signal to disengage the relay when the second timer times out, where and V2<V3<V1 and T2<T1.

13. The unit of claim 7 further comprising an input to generate an override signal wherein the processor is configured to generate the signal to engage the relay in response to the override signal to implement a second timer function to count down a time period T2, and to discontinue the engage signal to disengage the relay when the second timer times out.

14. A power control system comprising:
a battery;
a first contact to connect to the battery;
a second contact to connect to the device;
a relay disposed between the first contact and the second contact to electrically connect the first contact to the second contact in response to a signal;
a voltage detector connected to the first contact to detect a voltage at the first contact; and
a processor to generate the signal to engage the relay if the voltage detected by the detector is above a predetermined level V1, to implement a timer function to count down a time period T1 when the detected voltage falls below V1 and the relay is engaged, to reset the timer if the detected voltage rises above V1 during a countdown, and to remove the signal to disengage the relay when the timer times out, and to remove the engage signal to disengage the relay if the detected voltage falls below a second predetermined voltage V2, wherein V2<V1.

15. The system of claim 14 further comprising:
a third contact to connect to the battery; and
a high and low voltage detector to generate a high and low voltage detection signal in response to high voltage V3 and low voltage V4, wherein the processor is configured to generate the engage signal in response a detected voltage V3 or V4 to engage the relay.

16. The system of claim 14 further comprising an output to generate a signal to cause a device connected to the output to initiate a shutdown protocol wherein the processor is configured to generate the output signal at a predetermined time period T2 before the expiration of the timer countdown.

17. The system of claim 14 further comprising an input to connect to an external clock, wherein the processor generates an engage signal to engage the relay in response to a signal on the input.

18. The system of claim 14 wherein the processor is configured to implement a second timer function to count down a time period T2 when the detected voltage falls below a third predetermined voltage V3 and the relay is engaged, to discontinue the second timer if the detected voltage rises above V3 during the countdown, and to remove the engage signal to disengage the relay when the second timer times out, where and V2<V3<V1 and T2<T1.

19. The system of claim 14 further comprising an input to generate an override signal wherein the processor is configured to generate the signal to engage the relay in response to the override signal to implement a second timer function to count down a time period T2, and to discontinue the engage signal to disengage the relay when the second timer times out.

20. The system of claim 14 further comprising an engine and an engine sensor to detect operation of the engine wherein the processor is configure to generate the signal to engage the relay when engine operation is detected, to implement the timer function when no operation of the engine is detected, to reset the timer if the detected voltage rises above V1 during a countdown or engine operation is detected, and to remove the signal to disengage the relay when the timer times out.

21. The system of claim 20 further comprising means for removing noise from the engine sensor causing the engine sensor to generate false indications of engine operation to the processor and preventing starting of the timer function.

* * * * *